Feb. 12, 1957 W. C. RUPP 2,781,093
GAUGE FOR PAPER CUTTING AND LIKE MACHINES
Filed Feb. 19, 1954 3 Sheets-Sheet 1

INVENTOR.
WILLIAM C. RUPP
BY
Oberlin + Limbach
ATTORNEYS.

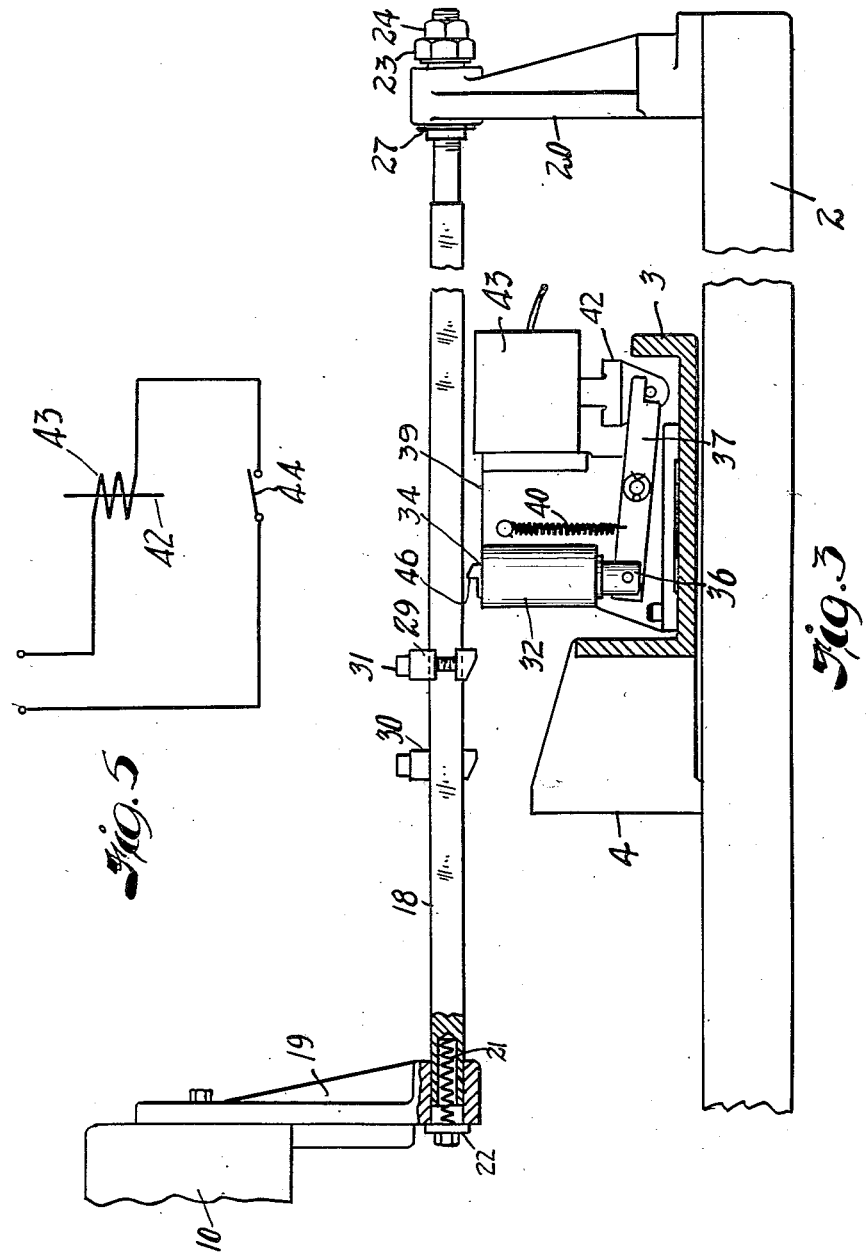

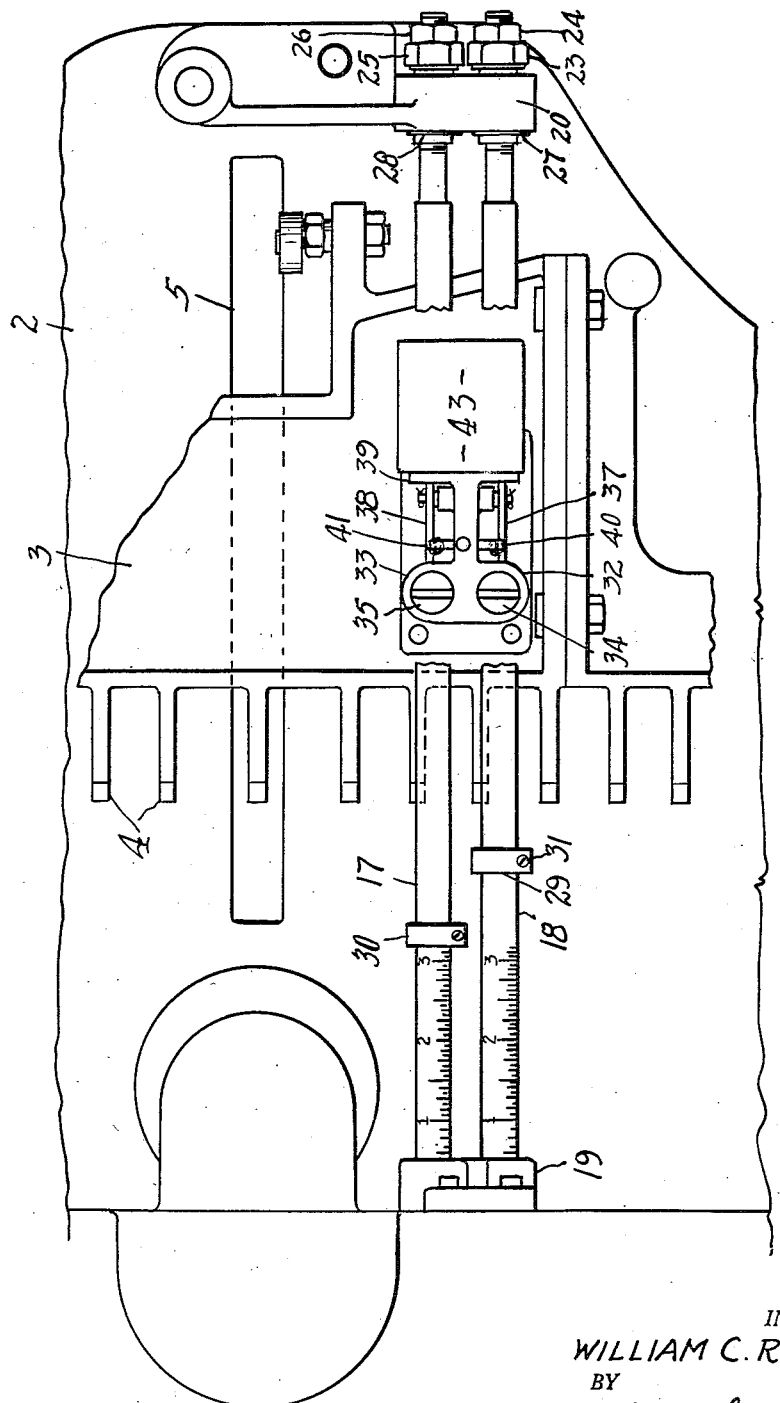

United States Patent Office 2,781,093
Patented Feb. 12, 1957

2,781,093

GAUGE FOR PAPER CUTTING AND LIKE MACHINES

William C. Rupp, Parma, Ohio, assignor to The Chandler & Price Company, Cleveland, Ohio, a corporation of Ohio Application February 19, 1954, Serial No. 411,309

9 Claims. (Cl. 164—59)

This invention relates as indicated to a gauge for paper cutting and like machines, and more particularly to means for positioning such gauge in relation to the knife of the machine or other fixed point of reference.

When making a series of cuts in a stack of sheets for example, it is desired to advance the back gauge in appropriate increments properly to position the stack for each such cut. When the process is to be repeated several times, there is a considerable saving in time and a greater likelihood of accuracy if appropriate stops may be preset to determine each increment of advance of the back gauge. Various devices for this purpose have been proposed in the past including, for example, the one described and claimed in Jirousek Patent 2,270,848.

Accessories of this nature naturally add considerably to the cost of the machine, and it is accordingly desirable that they be of as simple construction as possible and still achieve the desired purpose. It is furthermore desirable that there be as few moving parts as possible to reduce the influence of wear upon the accuracy of the device and also to reduce the likelihood of breakage, jamming and the like.

Another object of my invention is to provide a machine with a back gauge of the type indicated which is readily accessible to the operator and which may be very quickly and precisely set by him in a minimum of time.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a fragmentary side elevation on an enlarged scale of such back gauge control means, partly in section;

Fig. 4 is a top plan view corresponding to Fig. 3; and

Fig. 5 is a wiring diagram of the control means actuating mechanism.

Figure 1:
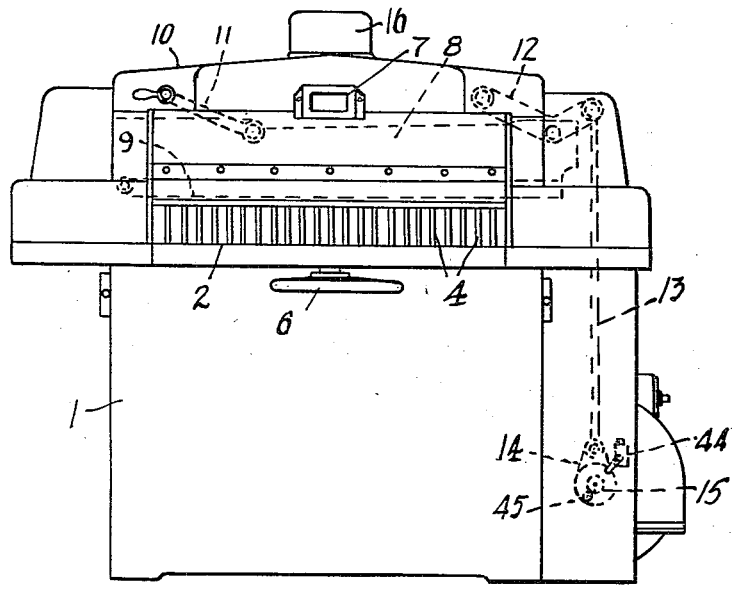
Fig. 1 is a front elevational view of a paper cutting machine having a movable back gauge.
Figure 2:
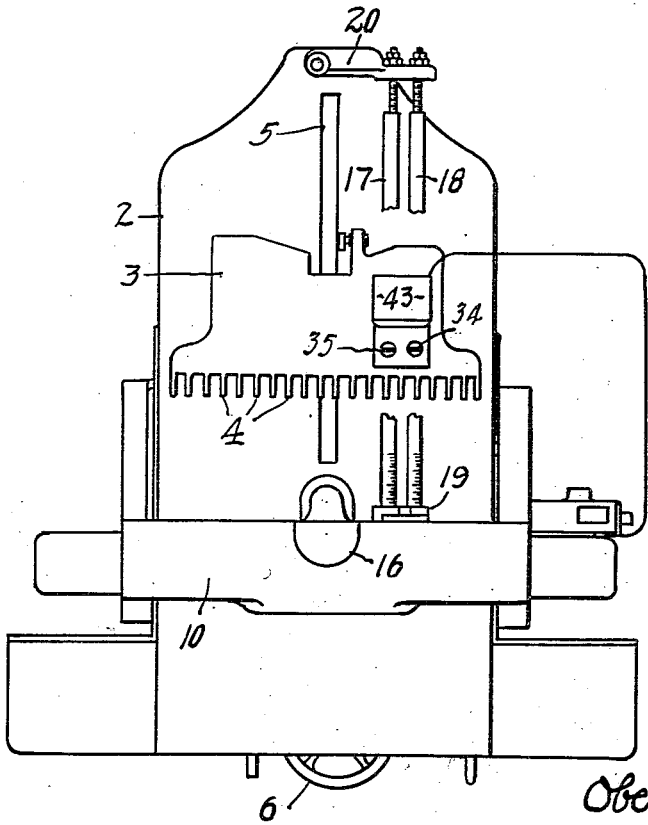
Fig. 2 is a semi-diagrammatic top plan view of such machine with a portion of the gauge control means broken away better to show the back gauge proper.

Referring now more particularly to Figs. 1 and 2 of the drawing, the new mechanism of my invention may be incorporated in a paper cutting machine of generally conventional construction comprising a base frame 1 carrying a bed or table 2 on which a stack of sheets may be positioned to be cut. A back gauge 3 provided with a plurality of upstanding flanges or fingers 4 is mounted for forward and rearward movement along way 5 in table 2 by means of a hand wheel 6 in conventional manner. The position of such gauge may be indicated by means of a traveling steel tape in window 7 as described in Reichart Patent No. 2,203,547.

A knife bar 8 carrying knife 9 is mounted for generally vertical reciprocation in upper frame 10, being supported therein by links 11 and 12 to ensure a transverse slicing cut as the knife is brought down. Receprocation of the knife is obtained through link 13 pivotally connected to the end of link 12 and crank 14 keyed to crankshaft 15. The means for driving such crankshaft is illustrated and described in my prior Patents Nos. 2,633,195 and 2,633,219.

A binder clamp (not shown) is likewise mounted in vertical ways in housing 10 for reciprocation behind knife bar 8 by means of electric motor 16. Referring now more particularly to Figs. 3 and 4 of the drawing, a pair of longitudinally reciprocable bars 17 and 18 are mounted with their forward ends in bracket 19 secured to housing 10 and their rear ends in bracket 20 mounted on the rear end of table 2. The forward ends of such bars are drilled as shown in Fig. 3 to receive compression springs such as 21 bearing against a plate 22 bolted to bracket 19 and accordingly tending to urge such bars rearwardly. The rearward ends of such bars (right-hand ends as viewed in Figs. 3 and 4) pass through bracket 20 and have nuts 23, 24 and 25, 26 threaded on their protruding ends precisely to limit the amount of reciprocation permitted the bars in the direction of advance of back gauge 3. The reciprocation of such bars rearwardly (to the right) is similarly limited by means of split lock washers 27 and 28 fitting in grooves in axially extending sleeve portions integral with nuts 23 and 25. Such washers normally engage the other side of bracket 20 and may be adjusted in position by loosening nuts 24 and 26 and then turning nuts 23 and 25.

The forward ends of bars 17 and 18 may be of rectangular cross-section as shown and held against rotation by bracket 19, and the rear ends of such bars may be turned to cylindrical cross-section to permit the same to be threaded. Actually, the number of bars which may thus be provided is optional and for many purposes a single bar may suffice. When provision for very slight increments of advance of the back gauge is desired, however, two or more such bars may be desirable as will become more apparent below.

Adjustable stops such as 29 and 30 may be clamped in selected positions along bars 18 and 17 by means of screws 31, such bars being ruled from left to right, the zero point corresponding to the right face of the knife blade and the scale being applied to the bars with the latter held shifted to the left against the action of the compression springs to the extent permitted by stops 23 and 25, and with due allowance for the distance between plungers or counterstops 34, 35 described below and the front face of the gauge.

Mounted on the upper surface of back gauge 3 are two vertically extending cylinders 32 and 33 having plungers 34 and 35 therein respectively vertically reciprocable beneath bars 18 and 17. The downwardly protruding ends of such plungers such as 36 are pivotally connected to the ends of levers 37 and 38, themselves pivotally mounted intermediate their ends on casting 39 carrying such cylinders. Tension springs 40 and 41 engage such levers 37 and 38 which normally serve to hold the respective plungers 34 and 35 in upwardly extended positions to engage stops 29 and 30 as the back gauge advances. The other ends of levers 37 and 38 are pivotally and slidingly engaged (the pivotal connections of the lower ends of the plungers to the other ends of such levers likewise afford a degree of sliding movement) by the armature 42 of solenoid 43.

A normally open limit switch 44 (Fig. 1) is mounted on the frame of the machine in series with solenoid 43 and is adapted to be engaged by an operating lug 45 on crank 14 when such crank turns to bring down the knife to make the cut. The switch is located for actuation when the cut has been completed but preferably prior to the return of the knife to its uppermost position.

Referring now again to Fig. 3 of the drawing, the operation of the above-described mechanism will now become clear. Assuming for the moment that the stops have been removed from bar 17 and that there are a plurality of stops 29 on bar 18, such latter stops will first be arranged by the operator at proper points along bar 18 to afford the desired series of cuts as indicated on the scale on such bar and will be clamped securely in place by means of screws 31. Hand wheel 6 will then be turned to advance back gauge 3 until the flat forward face 46 of plunger 34 engages the corresponding flat rearward face of stop 29. When this happens, the hand wheel 6 may be turned slightly more, further to advance back gauge 3 through shifting of bar 18 to the left against the action of compression spring 21. Movement is, however, brought to a precise and definite stop when nut 23 engages bracket 20. At this time the front face of the back gauge 3 will be a distance from the knife equal to the figure on the scale on bar 18 corresponding to the rearward face of stop 29.

The operator now presses the control lever to actuate the drive means whereby crank 14 is rotated through one cycle to bring down the knife 9 to make the cut and to return the knife to uppermost position. Immediately after making the cut, lug 45 engages limit switch 44 momentarily to close the latter as crank 14 turns. When such switch is closed (Fig. 5), solenoid 43 is energized to reciprocate armature 42 (Fig. 3) to depress the left-hand end of lever 37 against the action of tension spring 40 and accordingly to disengage plunger or counterstop 34 from stop 29. Immediately such elements are disengaged, compression spring 21 becomes effective to snap bar 18 to the right so that stop 29 will now be directly above the highest part of plunger 34. Limit switch 44 reopens as crank 14 continues to turn so that solenoid 43 is de-energized and spring 40 again becomes effective to reciprocate plunger 34 upwardly. Such plunger is, however, now unable again to engage the same stop 29 since such latter stop is directly above the same. The operator again turns hand wheel 6 to advance back gauge 3 to clear plunger 34 from said stop 29 and to continue the advance of the back gauge until such plunger or counterstop engages the next stop 29 secured to bar 18. Obviously a large number of such stops 29 may be employed depending on the number and spacing of the cuts desired.

The individual stops 29, of course, cover a portion of the scale on bar 18 so that there is a limit to the closeness between successive cuts obtainable when utilizing only such stops 29 on bar 18. When two very close successive cuts are desired, additional stops 30 will be mounted on bar 17 with a stop 30 advanced the desired small increment relative to a corresponding stop 29. Accordingly, when the mechanism is operated as above described and plunger 34 is incapacitated from engaging another stop 29 until it has cleared the first such stop 29, the other plunger 35 may nevertheless engage a corresponding stop 30 on bar 17 with a very slight further advance of back gauge 3. Of course, stops 29 and 30 and plungers 34 and 35 are bevelled so that when the back gauge 3 is returned (to the right) to starting position, the plungers will merely be cammed down against the action of springs 40 and 41 as they pass the various stops.

It will be seen from the foregoing that my new back gauge control mechanism, once preset, is automatic in operation and all that is required of the operator is that he fully advance the back gauge to the extent permitted when it is released after the making of each cut. The established sequence of cuts may be made indefinitely without possibility of error and the working parts of the mechanism are so simple and so positive in operation as to require very little maintenance or repair.

The limited reciprocation permitted bars 17 and 18 toward the knife against the action of springs 21 will ordinarily be as short as possible and still ensure against reengagement of the stops and counterstops when the bar snaps back to the right (Fig. 1) after the cut. This reciprocation of the bars determines the narrowest cut that may be measured by the mechanism.

Other modes of applying the principle of the invention may be employed, change being made as regards the details described, provided the features stated in any of the following claims or the equivalent of such be employed.

I therefore particularly point out and distinctly claim as my invention:

1. In a paper cutting machine having a table adapted to support a stack of sheets thereon, a knife mounted for reciprocation in a vertical plane to cut such stack, a crank adapted to reciprocate said knife, and a back gauge mounted on said table for reciprocation therealong toward and away from said knife to advance such stack into selected cutting positions; a fixed bracket on said machine adjacent said knife, a bracket on said table adjacent the rear end thereof, two parallel bars extending between said brackets normal to the plane of said knife and mounted for axial reciprocation toward and away from said knife, stop means precisely limiting the extent of such reciprocation toward said knife, resilient means urging said bars away from said knife, stop means limiting movement of said bars away from said knife, a ruled scale on each said bar, stops mounted on said bars having lower faces upwardly beveled on their sides toward said knife, two plungers mounted on said gauge for vertical reciprocation beneath said respective bars, the upper ends of said plungers being beveled on the sides away from said knife, resilient means normally holding said plungers in upper position to engage said stops on said respective bars when said gauge is advanced toward said knife, lever means pivotally connected to the lower ends of said plungers, a solenoid engaging said lever means adapted when energized to rock the same to retract said plungers downwardly out of stop-engaging position, a normally open limit switch in series with said solenoid operative when closed to energize said solenoid, and a lug on said crank adapted to engage and close said switch when said crank turns bringing said knife past a point in its cycle completing its cut and to release said switch before said crank completes its cycle to leave the knife in uppermost position.

2. In a paper cutting machine having a table adapted to support a stack of sheets thereon, a knife mounted for reciprocation in a vertical plane to cut such stack, a crank adapted to reciprocate said knife, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a plunger mounted on said gauge beneath said bar for vertical reciprocation, resilient means normally effective to hold said plunger in upwardly extended position to engage said stop when said gauge is shifted toward said knife, whereby said bar may be reciprocated toward said knife and further advance of said gauge thereupon halted, solenoid means connected with said plunger adapted when energized to retract the latter downwardly out of stop-engaging position, whereupon said first resilient means becomes effective to return said bar away from said knife to displace said stop from plunger-engaging position, a normally open limit switch operative when closed to energize said solenoid, and switch-engaging means movable in synchronism with said crank to close said switch upon completion of downward reciprocation of said knife and to release said switch upon upward return movement of said knife.

3. In a paper cutting machine having a table adapted to support a stack of sheets thereon, a knife mounted for reciprocation in a vertical plane to cut such stack, knife reciprocating means, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a plunger mounted on said gauge for reciprocation toward and away from stop-engaging position, resilient means normally effective to hold said plunger in extended position to engage said stop when said gauge is shifted toward said knife, whereby said bar may be reciprocated toward said knife and further advance of said gauge thereupon halted, solenoid means connected with said plunger adapted when energized to retract the latter out of stop-engaging position, whereupon said first resilient means becomes effective to return said bar away from said knife to displace said stop from plunger-engaging position, a normally open limit switch operative when closed to energize said solenoid, and switch-engaging means movable in synchronism with said knife-reciprocating means to close said switch upon completion of downward reciprocation of said knife and to release said switch upon upward return movement of said knife.

4. In a paper cutting machine having a table adapted to support a stack of sheets thereon, a knife mounted for reciprocation in a vertical plane to cut such stack, knife reciprocating means, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a counterstop on said gauge mounted for movement into and out of stop-engaging position, means normally operative to hold said counterstop in position to engage said stop when said gauge is shifted toward said knife, whereby said bar may be reciprocated toward said knife a limited distance and further advance of said gauge thereupon halted, and solenoid means operative in timed relation to reciprocation of said knife by said knife reciprocating means to move said counterstop out of stop-engaging position and thereby permit return reciprocation of said bar under influence of said resilient means to move said bar past counterstop-engaging position.

5. In a paper cutting machine having a table adapted to support a stack of sheets thereon, a knife mounted for reciprocation in a vertical plane to cut such stack, knife reciprocating means, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar and adjustable therealong, means for securing said stop in selected position, a counterstop on said gauge mounted for movement into and out of stop-engaging position, means normally operative to hold said counterstop in position to engage said stop when said gauge is shifted toward said knife, whereby said bar may be reciprocated toward said knife a limited distance and further advance of said gauge thereupon halted, and means operative in timed relation to reciprocation of said knife by said knife reciprocating means to move said counterstop out of stop-engaging position and thereby permit return reciprocation of said bar under influence of said resilient means to move said bar past counterstop-engaging position.

6. In a paper cutting machine having a table adapted to support a stack of sheets thereon, a knife mounted for reciprocation in a vertical plane to cut such stack, knife reciprocating means, and a back gauge mounted on said table for reciprocation therealong toward and away from said knife to advance such stack into selected cutting position; a bar mounted for precisely limited axial reciprocation in a direction normal to the plane of said knife, resilient means urging said bar away from said knife, a stop mounted on said bar, a counterstop on said gauge adapted to engage said stop when said gauge is shifted toward said knife, whereby said bar may be reciprocated toward said knife a limited distance and further advance of said gauge thereupon halted, and means operative in timed relation to reciprocation of said knife to disengage said stop and counterstop and thereby permit return reciprocation of said bar under influence of said resilient means to move said stop past counterstop-engaging position.

7. In paper cutting machines and the like having a movable gauge; positioning means for said gauge comprising stops, a counterstop on said gauge adapted successively to engage said stops, means mounting all said stops for limited movement as a unit in the direction of movement of said gauge when engaged by the counterstop on the latter, resilient means arranged to resist such movement of said stop mounting means, and means operable to retract said counterstop out of engagement with an opposed stop to enable said resilient means to shift said stop bodily rearwardly to return the same out of counterstop-engaging position.

8. In paper cutting machines and the like having a movable gauge; positioning means for said gauge comprising stops, a counterstop on said gauge adapted successively to engage said stops, means mounting said stops for limited straight line movement in the direction of movement of said gauge when engaged by the counterstop on the latter, resilient means arranged to resist such movement of said stops, and means operable to disengage said counterstop and an opposed stop to enable said resilient means to shift said stop rearwardly out of counterstop-engaging position.

9. In paper cutting machines and the like having a movable gauge; positioning means for said gauge comprising stops, a counterstop on said gauge adapted successively to engage said stops, means mounting said stops and counterstop for limited relative straight line movement in the direction of gauge movement independently of movement of said gauge, means operable to disengage said counterstop and an opposed stop independently of further gauge movement, and means operative thereupon to impart such limited relative movement to said stop and counterstop to prevent reengagement and permit subsequent further advance of said gauge.

References Cited in the file of this patent

UNITED STATES PATENTS

| 1,701,158 | Juul | Feb. 5, 1929 |
| 2,187,827 | Eickman | Jan. 23, 1940 |
| 2,270,848 | Jirousek | Jan. 27, 1942 |